United States Patent
Chaudhuri et al.

(10) Patent No.: US 12,373,502 B2
(45) Date of Patent: Jul. 29, 2025

(54) GENERATING AND PRESENTING SEARCH FILTER RECOMMENDATIONS

(71) Applicant: Oracle International Corporation, Redwood Shores, CA (US)

(72) Inventors: Anshuk Pal Chaudhuri, Karnataka (IN); Vishal Jain, Karnataka (IN); Varun Bharti, Karnataka (IN); Raj Karpana Alagumalai, Redmond, WA (US); Uzair Bin Tariq, Bellevue, WA (US); Subash Bhamidipati, Issaquah, WA (US); Kuldip Oberoi, Milpitas, CA (US); Karan Nayyar, Foster City, CA (US); John Ray Thomas, Aptos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/758,221

(22) Filed: Jun. 28, 2024

(65) Prior Publication Data
US 2025/0005083 A1 Jan. 2, 2025

Related U.S. Application Data

(60) Provisional application No. 63/511,535, filed on Jun. 30, 2023.

(51) Int. Cl.
*G06F 16/9532* (2019.01)
*G06F 16/9535* (2019.01)

(52) U.S. Cl.
CPC ...... *G06F 16/9532* (2019.01); *G06F 16/9535* (2019.01)

(58) Field of Classification Search
CPC .............. G06F 16/9532; G06F 16/9535
See application file for complete search history.

(56) References Cited

U.S. PATENT DOCUMENTS

| 8,645,825 B1 * | 2/2014 | Cornea | G06F 40/232 715/257 |
| 10,198,514 B1 | 2/2019 | Krotkov et al. | |

(Continued)

OTHER PUBLICATIONS

"Faceted Filtering for eCommerce Websites The Definitive Guide," Argoid, Retrieved from https://www.argoid.ai/blog/faceted-filtering, 2023, pp. 17.

(Continued)

*Primary Examiner* — Jay A Morrison
(74) *Attorney, Agent, or Firm* — Invoke

(57) ABSTRACT

Techniques for generating and presenting search filter recommendations are disclosed. A system determines a composition of search filter tiles, including a relative number of machine learning-generated search filter tiles and non-machine learning-generated search filter tiles, based on recommendation criteria. The recommendation criteria include an amount of user search history data that exists. The system applies search filter recommendation policies to generate a set of search filter recommendations, including hard-coded search filters, search filter recommendations generated by a user-specific machine learning model, search filter recommendations generated by a machine learning model trained on data from multiple different users, and algorithm-based recommendations. The system generates different sets of search filter recommendations made up of different ratios of recommendations from different sources based on determining if search filter criteria are met.

20 Claims, 9 Drawing Sheets

(56) References Cited

U.S. PATENT DOCUMENTS

| | | | |
|---|---|---|---|
| 10,223,464 B2 | 3/2019 | Winstanley et al. | |
| 10,983,675 B1* | 4/2021 | Barbhaya | G06F 3/0489 |
| 11,580,099 B2 | 2/2023 | Chen et al. | |
| 2016/0070722 A1* | 3/2016 | Heyward | G06F 16/5846 |
| | | | 707/772 |
| 2018/0046721 A1 | 2/2018 | Thornton et al. | |
| 2020/0379958 A1* | 12/2020 | Riggs | G06F 16/2358 |
| 2022/0269678 A1 | 8/2022 | Li et al. | |
| 2023/0080592 A1* | 3/2023 | Kroeller | G06N 3/08 |
| | | | 701/533 |
| 2023/0384916 A1 | 11/2023 | Sadeh et al. | |

OTHER PUBLICATIONS

"Filter suggestions—Algolia," Retrieved from https://www.algolia.com/doc/guides/solutions/ecommerce/filtering-and-navigation/tutorials/filtersuggestions/, Feb. 23, 2024, pp. 8.

"Optimizing Data Exploration with Dynamic Data Filters," GROW, Retrieved from https://www.grow.com/blog/optimizing-data-exploration-with-dynamic-data-filters, Retrieved on Aug. 1, 2024, pp. 8.

Burley., "Autogenerate Search Facets to Help Visitors Convert," Coveo, Dec. 6, 2022, pp. 9.

Kennedy., "The definitive guide to the difference between filters and facets," Medium, Oct. 23, 2018, pp. 18.

\* cited by examiner

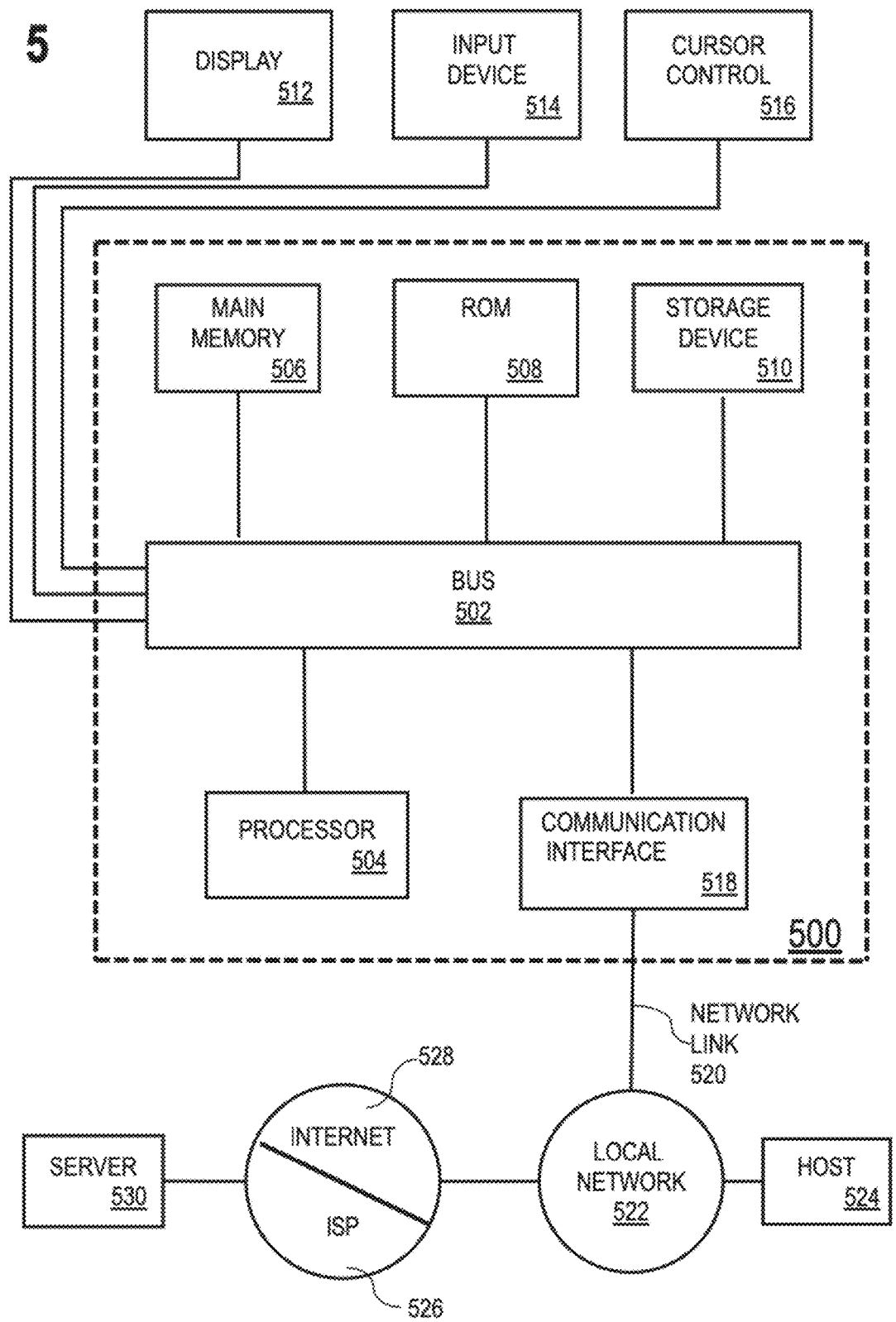

GENERATING AND PRESENTING SEARCH FILTER RECOMMENDATIONS

INCORPORATION BY REFERENCE; DISCLAIMER

Each of the following applications is hereby incorporated by reference: Application No. 65/511,535, filed Jun. 30, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to generating and presenting recommended search filters. In particular, the present disclosure relates to presenting a user with a combination of (a) a recommended search filter generated by a machine learning model and (b) a recommended search filter defined by a developer.

BACKGROUND

When searching for data in a database or across a network, such as the Internet, a user frequently retrieves large quantities of matching documents or files, resulting in a significant amount of time sifting through results for relevant documents, files, and web pages. Some search engines attempt to reduce the burden on the user by providing suggestions for words to enter into a search field. However, even with suggested search terms, the number of documents, files, and web pages being searched stays the same. In addition, if a website provides an option for filtering search results, the options are static, often resulting in several selections by a user before the user can initiate a desired search.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 shows a block diagram that illustrates a computer system in accordance with one or more embodiments.

DETAILED DESCRIPTION

Figure 1A:
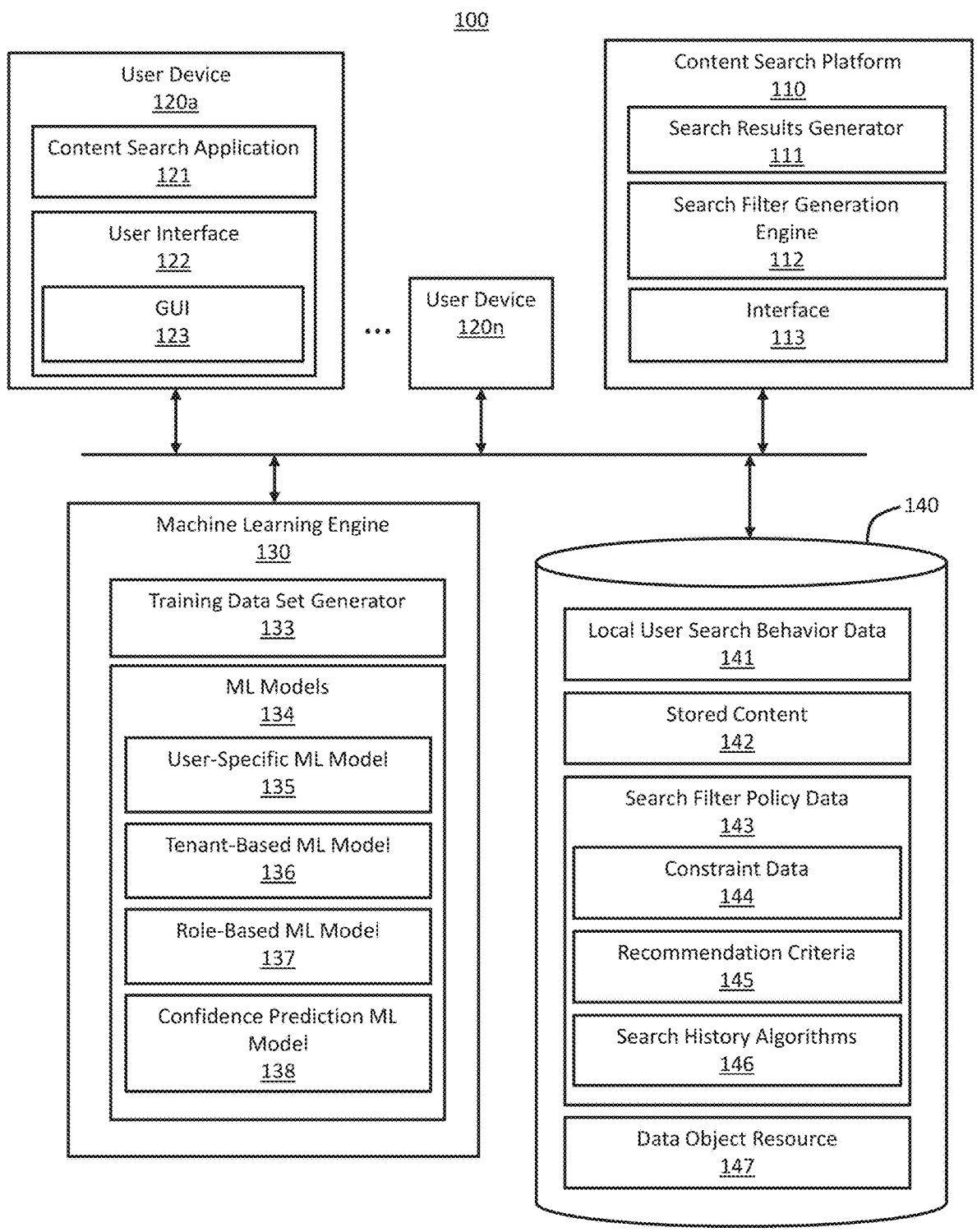
FIGS. 1A and 1B illustrate a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. SEARCH FILTER RECOMMENDATION ARCHITECTURE
3. GENERATING AND DISPLAYING RECOMMENDED SEARCH FILTERS
4. TRAINING A MACHINE LEARNING MODEL
5. EXAMPLE EMBODIMENT
6. COMPUTER NETWORKS AND CLOUD NETWORKS
7. HARDWARE OVERVIEW
8. MISCELLANEOUS; EXTENSIONS

1. General Overview

A system may recommend search filter tiles for selection by a user performing a search. Search filter tiles include graphical representations of search filter recommendations presented in a graphical user interface (GUI). For example, a search filter tile may include text content describing a search filter recommendation and a geometric shape, such as a rectangle, surrounding the text content. Selection of any portion of the tile within the geometric shape may result in the system applying the corresponding search filter to a set of search terms and/or search results.

One or more embodiments recommend search filter tiles for user selection, the search filter tiles including recommendations that are based on a machine learning model and recommendations that are not based on any machine learning model. The system determines a composition of search filter recommendations based on search filter criteria. Search filter criteria may include, for example, search history data including historical selections of search filters by the particular user, display data including the first number of the plurality of search filters, predefined rules specifying particular search filters, and confidence values associated with machine learning-generated search filter recommendations. The search filter recommendations are generated from different types of sources based on the search filter criteria. Examples of different types of sources include the following: a user-specific machine learning model, a role-based machine learning model, a tenant-based machine learning model, a non-machine learning algorithm, and hard-coding. If the system determines that a search filter recommendation criteria is not met, the system generates a set of search filter recommendations having a first ratio of the different types of recommendations. If the system determines that the search filter recommendation criteria is met, the system generates a set of search filter recommendations having a second ratio of the different types of recommendations. Accordingly, as conditions change, the system changes the different types of recommendations presented to a user for the same set of search terms. For example, as the number of searches executed by the user increases, the system increases the ratio of search filter recommendations generated by a user-specific machine learning model relative to group-based machine learning models and hard-coded search filter recommendations. Subsequent to determining the ratio, the system selects search filter tiles in accordance with the ratio. Specifically, the system selects a number of each respective type of search filter tiles based on the ratio. Based on the selected number of each respective type of search filter tiles, the system selects search filter tiles of the type to recommend for user selection.

According to an example, when a system detects a recommendation-generation trigger, such as a user navigating to a search browser page, the system retrieves the user's search history. Based on the user's search history, the system determines a number of search filter tiles to present to the user in a graphical user interface (GUI). The system determines a composition of search filter tiles, including a relative number of machine learning-generated search filter tiles and non-machine learning-generated search filter tiles, based on recommendation criteria. The composition may further include a number of search filter recommendations from different types of machine learning models. The composition may further include a number of search filter recommendations based on non-machine learning algorithms, such as mathematical and logical algorithms applied to a user's search history data. The recommendation criteria may include the following: if default or predefined search filters exist, weight values assigned to search filters, an amount of user search history data that exists, if search history data exists for other users in the same enterprise as a particular user, and if search history data exists for other users in a same role as the particular user.

One or more embodiments identify the recommendation criteria by identifying a recommendation policy. The recommendation policy may be stored in a data object associated with a displayed GUI. The system determines, based on the recommendation policy, how many recommended search filters of different types to present to a user. For example, if a number of filter selections and/or searches in the user's search history does not meet a threshold number, the system presents a set of recommended search filters with a larger percentage of non-machine learning-model generated recommendations relative to the machine learning-model generated recommendations. Non-machine learning-model generated recommendations include, for example, the user's most recent search filter selections or search value entries, a user's most frequently-selected filters and/or values, and developer-defined search filters. For example, a developer may create a set of data objects corresponding to different search filters. The data objects may specify that a particular recommendation should be displayed for a user with particular profile characteristics, such as a particular position in an organization, a user located in a particular region, or a user who is a member of a particular division of the organization. In one or more embodiments, the non-machine learning-model generated recommendations do not incorporate other users' selections and/or search entries to generate the recommendations. In contrast, the machine learning model incorporates search filter selections and/or search values as training data to train the model to generate recommendations for users. In one or more embodiments, the system presents a pair of (a) a search filter and (b) a search value to the user as a recommendation.

When a user selects a search filter to filter search query results, or when a user enters a search query value in a search field, the system transmits the selection and/or entry to a machine learning model training engine in a remote server from the user's device. The machine learning model training engine receives selections and/or entries from multiple different users performing searches across multiple different devices. When the system generates a set of recommended search filter tiles, a subset of tiles based on a user's search history or developer-defined recommendations do not include search data from other users. A subset of tiles based on the machine learning model recommendations includes search data from other users.

One or more embodiments generate a compound filter based on users' selections and/or the machine learning-model-generated recommendations. For example, to generate a compound filter, the system may aggregate a set of filter-value pairs selected by a user when performing searches. The system may then present the compound filter that includes the multiple filter-value pairs. When the system receives selection of the compound filter via a single user input (e.g., a single click), the system applies the multiple filters included in the compound filter.

One or more embodiments described in this Specification and/or recited in the claims may not be included in this General Overview section.

2. Search Filter Recommendation Architecture

Figure 1B:
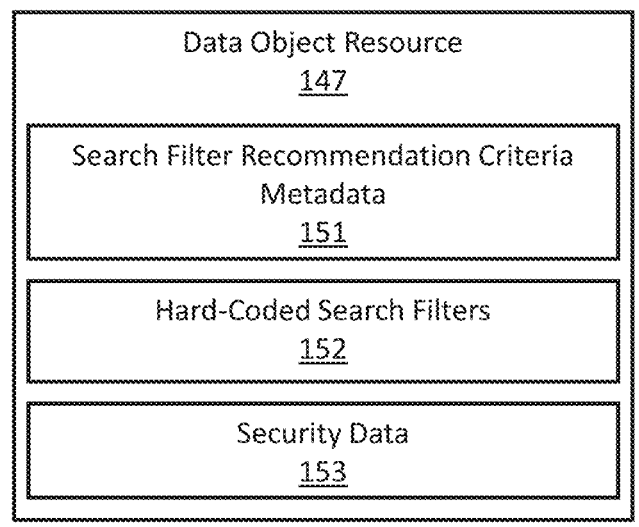

FIGS. 1A and 1B illustrate a system 100 in accordance with one or more embodiments. As illustrated in FIGS. 1A and 1B, system 100 includes a content search platform 110, a set of user devices 120a-120n, a machine learning engine 130, and a data repository 140. In one or more embodiments, the system 100 may include more or fewer components than the components illustrated in FIGS. 1A and 1B. The components illustrated in FIGS. 1A and 1B may be local to or remote from each other. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

Figure 2A:
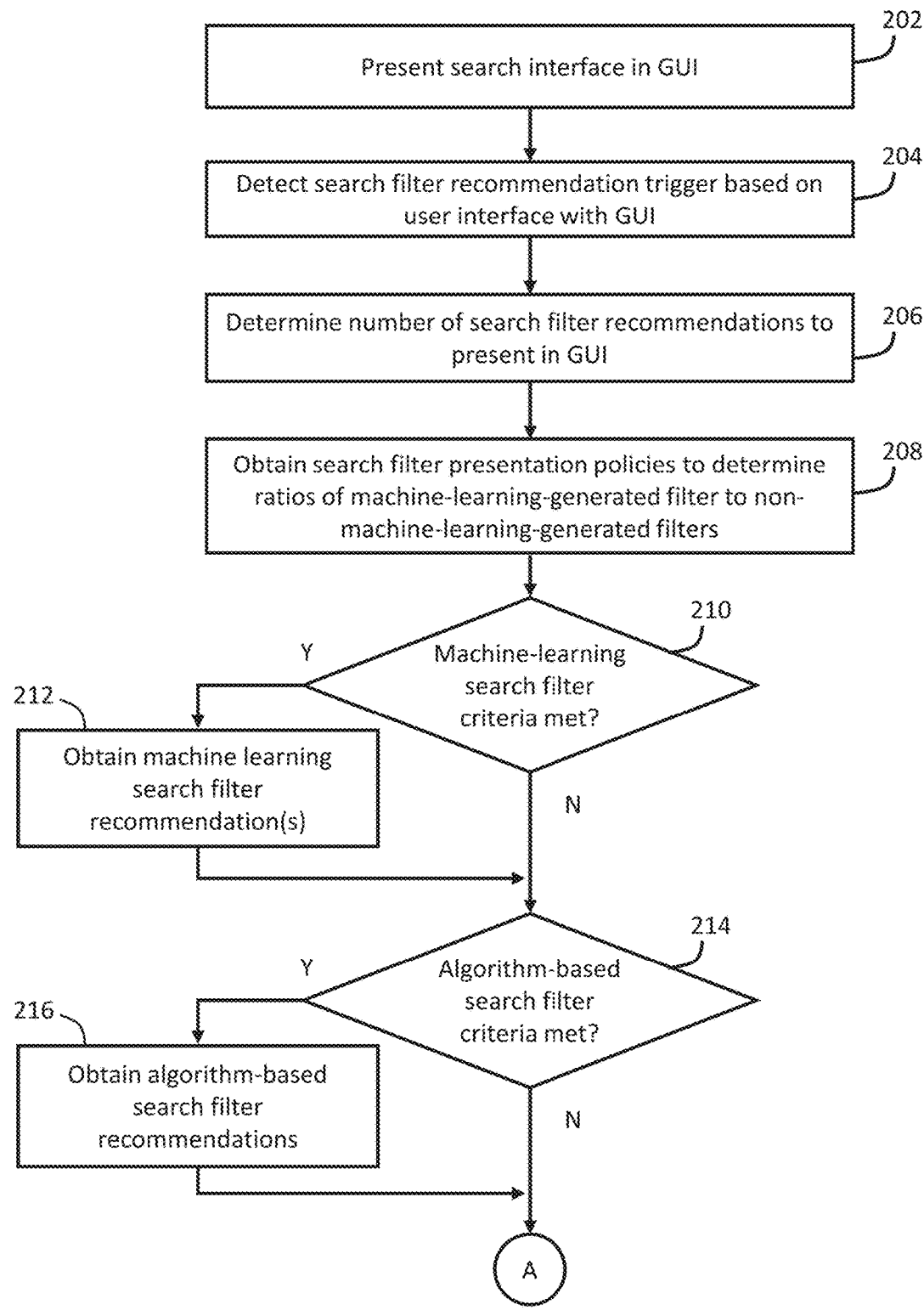
FIGS. 2A and 2B illustrate an example set of operations for generating search filter recommendations in accordance with one or more embodiments.
Figure 2B:
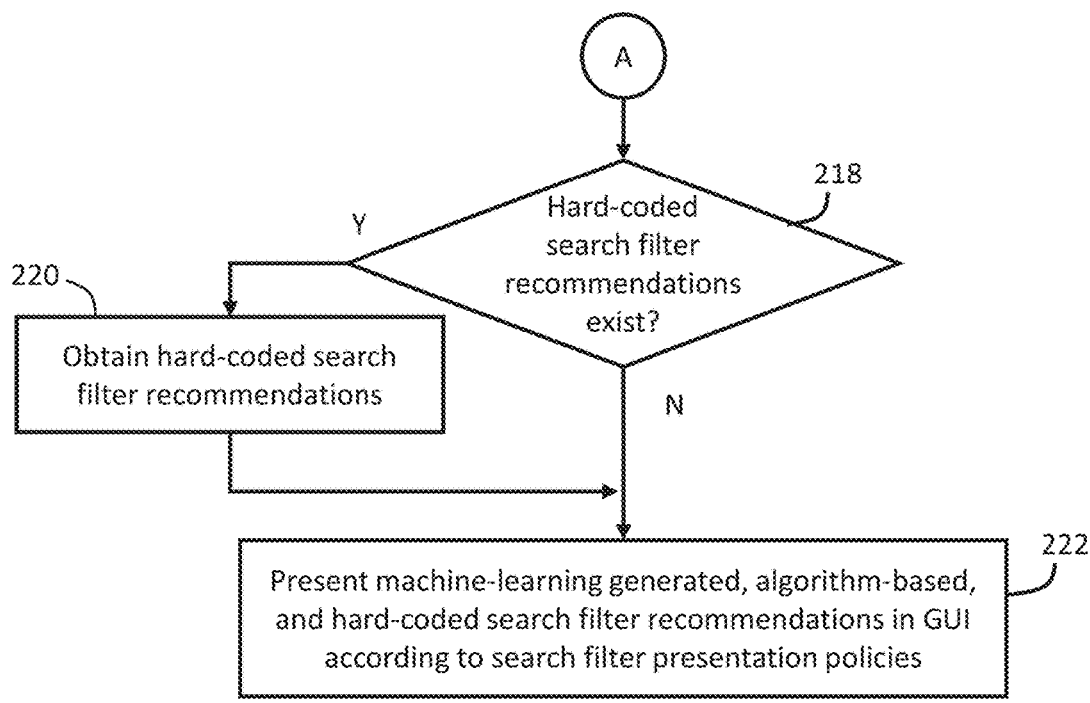

In one or more embodiments, the content search platform 110 refers to hardware and/or software configured to perform operations described herein for searching stored content, presenting search filter recommendations associated with the searches, and modifying and re-executing searches based on selected search filter recommendations. Examples of operations for generating and presenting search filter recommendations are described below with reference to FIGS. 2A and 2B.

In an embodiment, the content search platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a mobile handset, a smartphone, a personal digital assistant ("PDA"), a wireless receiver and/or transmitter, a base station, a communication management device, a router, a controller, an access point, and/or a client device.

According to one or more embodiments, the content search platform 110 is distributed across multiple networked devices. For example, a client device runs a client application to present content from data files and records to a user via a user interface 122, including a graphical user interface (GUI) 123. The client application communicates with a cloud-based application via an interface 113 to transmit content search requests for content 142 stored in a repository 140 and to receive content from the content search platform 110. Additional embodiments and/or examples relating to computer networks are described below in Section 6, titled "Computer Networks and Cloud Networks."

In one or more embodiments, a data repository 140 is any type of storage unit and/or device (e.g., a file system, database, collection of tables, or any other storage mechanism) for storing data. Furthermore, a data repository 140 may include multiple different storage units and/or devices. The multiple different storage units and/or devices may or may not be of the same type or located at the same physical site. Furthermore, a data repository 140 may be implemented or executed on the same computing system as the content search platform 110. Additionally, or alternatively, a data repository 140 may be implemented or executed on a computing system separate from content search platform 110. The data repository 140 may be communicatively coupled to the content search platform 110 via a direct connection or via a network.

Information describing local user search behavior data 141, stored content 142, and search filter policy data 143 may be implemented across any of components within the system 100. However, this information is illustrated within the data repository 140 for purposes of clarity and explanation.

The search results generator 111 receives queries from a content search application 121 and generates a set of results. The search results generator 111 searches the stored content 142 to identify documents and/or files that match a set of search terms generated by the content search application 121. For example, a user may interact with interface elements in the GUI 123 to specify a set of search terms. In addition to documents and/or files, the search results generator 111 may provide in the GUI 123 links to the documents and/or files, such as by providing uniform resource locator (URL) addresses that would direct the user to web pages that include content matching a set of search terms. In one or more embodiments, the search results generator 111 includes a database server. Additionally, or alternatively, the search results generator 111 includes a search engine.

A search filter generation engine 112 generates search filter recommendations to present in the GUI 123. The search filter generation engine 112 generates search filter recommendations based on search filter policy data 143. The search filter policy data 143 may be stored, for example, in data object resources. The data object resources may store metadata associated with applications, data sets, and predefined views of data sets (e.g., groups of data objects represented as nodes in a GUI). When a user accesses a particular GUI 123 associated with the content search application 121, the system may access a corresponding data object resource to identify operations and data sets associated with the GUI 123 and/or the content search application 121. For example, the GUI 123 may present a particular data view including a particular set of nodes representing data objects. The system may access a data object resource that stores metadata associated with the particular data view.

FIG. 1B is an example of a data object resource 147 associated with a particular content search application data view that includes a text search field to retrieve and present stored content 142. The data object resource 147 stores search filter recommendation criteria metadata 151. The search filter recommendation criteria metadata 151 includes criteria for determining whether or not to generate and/or display different types of search filter recommendations, including machine learning-generated recommendations, algorithm-based recommendations, and hard-coded recommendations. In one embodiment, the data object resource 147 stores recommendation enablement values. Based on detecting values that satisfy criteria 151, the system may store enablement values to indicate that a corresponding recommendation type is enabled. For example, if the search filter recommendation criteria metadata 151 specify that the system should generate a machine learning-generated search filter recommendation based on receiving 5,000 user search records, the system may change an enablement value from a value indicating the recommendation type is "disabled" to a value indicating the recommendation type is "enabled" upon detecting the corresponding threshold is met.

The data object resource stores hard-coded search filters 152. A user, such as a developer or system administrator, may generate the hard-coded search filters 152. The system retrieves and presents the hard-coded search filters 152 in the GUI 123 based on detecting corresponding criteria are met.

The data object resource 147 further includes security data 153 specifying criteria for permitting users and/or applications to access data specified in the data object resource 147. For example, the security data 153 may specify authorization levels of employees in a company that may access data specified in the data object resource 147. The security data 153 may specify encryption keys required to be used by applications for accessing the data specified in the data object resource 147.

In one or more embodiments, the system stores search filter policy data 143 in one or more data object resources 147. The search filter generation engine 112 generates, presents, and arranges search filter recommendations in the GUI 123 based on the search filter policy data 143. The search filter policy data 143 includes constraint data 144. Constraint data 144 includes display data that constrains a number of displayable search filter recommendations. For example, constraint data may include a size of a search filter recommendation display region in the GUI 123, font size and style data for the search filter recommendations presented in the GUI 123, and any hard-coded constraints specifying a fixed number of search filter recommendations to be presented in the GUI 123. Constraint data 144 may additionally include conditions for adjusting a total number of displayed search filter recommendations. For example, the constraint data 144 may specify that the system presents a maximum of two hard-coded search filter recommendations in the GUI 123. If the conditions are met to present recommendations of additional types, such as machine learning-generated or algorithm-based, the system presents additional search filter recommendations. If the conditions are not met to present recommendations of additional types, the system presents the two hard-coded recommendations and refrains from presenting recommendations of additional types.

The search filter policy data 143 include recommendation criteria 145. The recommendation criteria 145 specify conditions for generating and/or presenting search filter recommendations of different types. In particular, the recommendation criteria 145 specify conditions for presenting machine learning-generated search filter recommendations, algorithm-based search filter recommendations, and hard-coded search filter recommendations. Machine learning-based search filter recommendations include search filter recommendations generated based on applying input data, including search terms entered in the GUI, to a trained machine learning model. Example machine learning models include a user-specific model 135 trained on a data set limited to search data for a user, a role-based model 137 trained on a data set including search data of multiple users having a same role in an enterprise, and a tenant-based model 136 trained on a data set, including search data from multiple users having different roles in the enterprise. Examples of types of recommendation criteria 145 include a number of searches recorded for a user, a number of searches recorded for multiple users, user profile data (such as a user's role in an organization), confidence values associated with machine learning model-generated search filter recommendations, and weights assigned to different types of recommendations.

The search filter policy data 143 further include search history algorithms 146. Search history algorithms include algorithms specifying a user's most recent search history data, most frequently selected search history data (e.g., selected search results and search filters), and search history algorithms for groups of users, such as users associated with a role in an organization or all users in an organization.

A machine learning engine 130 trains one or more machine learning models 134 based on respective training data sets generated by a training data set generator 133. The user-specific machine learning model 135 is trained on a set of training data including search data for a user. The search data may include, for example, search terms entered, search results selected, search filters presented, and search filters selected. The tenant-based machine learning model 136 is trained on a set of training data including search data for multiple users associated with a same tenant. For example, an organization may correspond to a tenant utilizing shared computing resources in a cloud environment. The tenant-based model 136 is trained with a set of training data including search data from multiple users in the organization. The role-based machine learning model 137 is trained on a set of training data including search data for multiple users having the same role in an organization. For example, the machine learning engine 130 may train one model to generate search filter recommendations for project managers. The system may train another model to generate search filter recommendations for salespersons. The system may train yet another model to generate search filter recommendations for inventory management personnel.

The machine learning engine 130 further trains a confidence prediction machine learning model 138 to generate confidence scores for recommendations generated by the models 135, 136, and 137. The confidence prediction model 138 may be a separate model from the models 135-137. Alternatively, the confidence prediction model 138 may be embodied as additional layers appended to the models 135-137. In other words, the confidence scores generated by the confidence prediction model 138 may be based on the input data provided to the models 135-137 as well as the search filter recommendations output from the models 135-137. In one or more embodiments, the confidence prediction machine learning model 138 includes a semantic analysis-type model. The semantic analysis model may be an encoder-only type model that does not include a decoder. The encoder-only-type model is configured to generate embeddings from input text. The embeddings encode semantic data. The system compares embeddings of search terms corresponding to a present search request to embeddings of terms included in a training data set to determine the relatedness of search terms to terms in the training data set. In one or more embodiments, the confidence prediction machine learning model 138 includes a classification head added to the semantic analysis, encoder-only type model. The additional classification head layers of the machine learning model generate confidence values for a search filter recommendation generated by one of the models 135-137 based on the embeddings.

In one or more embodiments, the machine learning engine 130 trains the machine learning models 135-138 using a machine learning algorithm. The machine learning algorithm is an algorithm that can be iterated to train a target model f that best maps a set of input variables to an output variable using a set of training data. In particular, a machine learning algorithm is configured to generate and/or train models 135-138 using respective sets of training data.

The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm, which in turn updates the target model f.

For example, the user-specific machine learning model 135 is trained on a set of training data including a user's search data. The training data may include various features, such as search terms entered by the user, search filters presented to the user, search filters selected by the user, and search results selected by the user. The training data set may include output labels associated with the search filters selected by the user. The system and/or a model administrator may generate further output labels associated with search filters determined to be the most relevant to a set of search terms. The user-specific machine learning model 135 is iteratively trained on records in the training data set to adjust parameters of the model until a specified performance metric, such as an accuracy level, is achieved.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, interfaces 113 and 122 refer to hardware and/or software configured to facilitate communications between a user and the content search platform 110 or the user device 120a. Interfaces 113 and 122 render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 113 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, interface 113 is specified in one or more other languages, such as Java, C, or C++.

In one or more embodiments, a tenant is a corporation, organization, enterprise or other entity that accesses a shared computing resource, such as content search platform 110 and stored content 142. In an embodiment, tenants are independent from each other. A business or operation of one tenant is separate from a business or operation of another tenant.

3. Generating Search Filter Recommendations

FIG. 2 illustrates an example set of operations for generating search filter recommendations in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the system presents a search interface in a graphical user interface (GUI) (Operation 202). The search interface may include a text entry field to receive user input specifying search terms. The search interface may additionally include interface elements, such as icons and other selectable visual representations. A system may generate search terms based on a user interaction with the interface elements. For example, a user may select interface elements with a cursor or drag-and-drop the interface elements into a particular region in the GUI.

In one or more embodiments, an enterprise maintains one or more applications to store and present data to employees and other users. The GUI may be an interface generated by one or more of the applications. For example, an enterprise may store data objects representing sets of data maintained by the enterprise, such as employee information, client information, and product information. The one or more applications may provide interfaces to allow employees to retrieve employee information, retrieve client information, and retrieve product information. The enterprise may maintain an interface webpage that allows employees to perform searches to identify data objects maintained by the enterprise. The interface webpage may also allow employees to search for content in external sources such as via the Internet.

The system detects a filter recommendation generation trigger based on a user interface with the GUI (Operation 204). For example, a user may begin entering text into a text search field. The system may detect the trigger prior to the user completing a text entry action. For example, the system may detect completion of the text entry action by detecting a user pressing an "enter" or "return" key or detecting some other selection action by a user to initiate a search based on the entered text terms. The system may detect the trigger upon the user completing the text entry action, such as by detecting the user pressing an "enter" key or selecting a corresponding icon in the GUI. Additionally, or in alternatively, the system may detect the user's selection of text terms in the GUI such as in a drop-down menu of recommended terms.

Based on the search filter recommendation trigger, the system determines a number of search filter recommendations to present in the GUI (Operation 208). In one example, the system analyzes display data to determine a number of search filters to present in the GUI. The display data may specify the dimensions available for displaying search filter recommendations, the dimensions of text that make up the search filter recommendations, and the dimensions of visual elements associated with the search filter recommendations. For example, the system may be configured to present search filter recommendations as "tiles." The tiles may include, for example, one or more text terms surrounded by a geometric shape such as a rectangle. The geometric shape may be filled by a color that is different from a background color of the GUI to distinguish the tile from the background. The text may correspond to a first set of dimensions (e.g., x and y coordinates in the GUI). The tile may correspond to a second set of dimensions.

A GUI may be displayed on devices that have different dimensions. For example, one device may measure 15 inches, diagonal. Another may measure 34 inches, diagonal. A handheld device may measure 6 inches, diagonal. The system may determine the number of search filter recommendations to present in the GUI based, in part, on the display area of a display device on which the GUI is being displayed.

In one embodiment, the system stores policies for presenting search filter recommendations in data object resources associated with displayed data. A data object resource associated with an application may specify, for example, the data sources that may be accessed by a text entry field. The data object resource may further include rules for presenting search filter recommendations. A set of rules for determining a number of search filter tiles to present may include dimensions of a display area of a display device, dimensions of a user interface region associated with searching content, rules to adjust a text size of text in search filter tiles while maintaining a size of search filter tiles, rules to maintain the text size of text in the search filter tiles while adjusting the sizes of the search tiles, rules to adjust both a text size of text in the search filter tiles and the size of the search filter tiles, as well as other criteria for determining the number of search filter tiles to present in the GUI. For example, as discussed in the operations that follow, a system may determine confidence values associated with machine learning-generated search filter recommendations. The rules may specify adjusting the number of search filter tiles presented based on the confidence values. In other words, Operation 206 may be performed subsequent to Operation 212 or Operation 216.

The system obtains search filter presentation policies to determine ratios of machine learning-generated search filters to non-machine learning-generated search filters to present in the GUI (Operation 208). In one example, the system stores search filter recommendation policies in the data object resources associated with a GUI. For example, if a system is running an application that allows a user to search data storage systems internal to an enterprise (such as enterprise customer data), the data object resources may be stored and maintained by the application. Different data object resources associated with different applications may store different search filter presentation policies.

The search filter recommendation policies include criteria for presenting search filter recommendations. Machine learning recommendation criteria specify conditions in which the system presents one or more machine learning generated search filters in the GUI. Algorithm-based criteria specify conditions in which the system presents one or more algorithm-generated search filters in the GUI. In the present specification and claims, the algorithm-based criteria do not include machine learning algorithms. Rather, the algorithm-based criteria include algorithms that determine sets of search filters based on applying logical and/or mathematical algorithms to search filter data.

For example, one set of algorithm-based criteria specifies conditions for presenting the N most frequently selected search filters for a user as search filter recommendations. Another set algorithm-based criteria specifies conditions for presenting the N most recently selected search filters for the user. Another example specifies conditions for presenting the N most frequently selected search filters for other users having the same role as a user entering search terms into a text entry field of a GUI. Another example specifies conditions for presenting the N most recently selected search filters for other users having the same role as a user entering search terms into a text entry field of a GUI. Yet another example specifies conditions for presenting the N most frequently selected search filters for other users in the same enterprise as the user entering search terms into a text entry field of a GUI regardless of positions of the other users within the enterprise.

Examples of machine learning recommendation criteria include criteria specifying conditions for (a) presenting search term data to a machine learning model, conditions for (b) presenting recommendations generated by the machine learning model as search filter recommendations in the GUI, and conditions for performing both (a) and (b). The machine learning recommendation criteria may include different sets of criteria for different types of machine learning models. One machine learning model may be trained on a single user's search history data. Another machine learning model may be trained on a set of data corresponding to multiple different users who are identified as having the same role in an enterprise. Yet another machine learning model may be trained on a set of data corresponding to all users across the enterprise. The different machine learning models may be associated with different machine learning recommendation criteria.

For example, a search filter presentation policy may include the following criteria specifying the following conditions:

If a number of records representing user searches is greater than 10,000, present the following: (1) Search Filter A (hard-coded), and (2) a combination of search filters corresponding to (A) recommendations from a user-specific machine learning model, (B) recommendations from a role-specific machine learning model, and (C) recommendations from the user's most-frequently/recently used (MFRU) history data at a ratio of 1:1:1. Priority for presentation is as follows: (1), then (2); and (A), then (B), then (C). In the above example, the priority specified in the policy directs the system to prioritize the display of one type of search filter recommendation above other types. For example, if a search filter display region permits the display of only three search filters, then the system would display (1) a hard-coded filter specified in a data object resource, (2) a recommendation from a user-specific machine learning model, and (3) a recommendation from a role-specific machine learning model. The system would refrain from displaying a recommendation for a search filter based on the user's MFRU history data. As another example, if the search filter display region permits the display of five search filters, the system would display (1) a hard-coded filter specified in a data object resource, (2) two recommendations from a user-specific machine learning model, (3) a single recommendation from a role-specific machine learning model, and (4) a single recommendation from the user's MFRU history data.

In one example embodiment, a data object resource includes machine learning recommendation enablement fields. When the system detects that a machine learning-generated search field recommendation enablement condition is met, the system sets a value in a corresponding field to correspond to "enabled." For example, a set of search filter recommendation policy data may include the following criteria:
 (1) if a number of search history records is less than a first threshold, (a) disable user-specific machine learning model recommendations, (b) disable search filter recommendations based on the user's MFRU history data, (c) enable role-specific machine learning model recommendations, (d) enable enterprise-wide machine learning model recommendations, and (e) enable hard-coded default recommendations;
 (2) if a number of search history records at least meets the first threshold and is less than a second threshold, (a) disable user-specific machine learning model recommendations, (b) enable search filter recommendations based on the user's MFRU history data, (c) enable role-specific machine learning model recommendations, (d) enable enterprise-wide machine learning model recommendations, and (e) enable hard-coded default recommendations;
 (3) if a number of search history records at least meets the second threshold and is less than a third threshold, (a) enable user-specific machine learning model recommendations, (b) enable search filter recommendations based on the user's MFRU history data, (c) enable role-specific machine learning model recommendations, (d) disable enterprise-wide machine learning model recommendations, and (e) disable hard-coded default recommendations.

In the above example embodiment, the system keeps track of the number of search history records for a user. As the system detects that the number of search history records meets the respective thresholds, the system automatically, without user intervention, modifies the values in the respective fields of the data object resource to enable/disable different types of search filter recommendations. When the user subsequently initiates the search filter recommendation trigger, the system retrieves the values from the recommendation-enablement fields of the data object resource to determine the types of recommendations to generate.

Based on the obtained search filter presentation policies, the system determines if a set of machine learning-generated search filter recommendation criteria are met (Operation 210). The machine learning-generated search filter criteria may include, for example, a number of searches in a user's search history, a number of search filter selections in a user's search history, and a user's role in an organization.

Based on determining the machine learning-generated search filter criteria are met, the system sends to a machine learning model a set of input data including the search terms associated with a current search (Operation 212). The set of input data may also include user search history data and user profile data, for example. The system receives from the machine learning model one or more search filter recommendations.

In one or more embodiments, determining if the set of machine learning-generated search filter recommendation criteria are met includes determining if different criteria are met for different types of trained machine learning models. For example, an enterprise may maintain (a) and enterprise-wide machine learning model for generating search filter recommendations, (b) a set of role-specific machine learning models to generate recommendations for employees in respective roles within the enterprise, and (c) a set of user-specific machine learning models to generate recommendations for specific employees. The different models are trained with different data sets of training data. The training data for the enterprise-wide model is obtained from searches conducted by employees in different roles across the enterprise. The training data for the role-specific machine learning model is obtained from searches conducted by employees in the same role across the enterprise. The training data for the user-specific machine learning model is obtained from searches conducted by a single employee. Based on the different types of training data, the different models may be trained to generate different search filter recommendations for the same sets of runtime input data.

Based on the obtained search filter presentation policies, the system determines if a set of algorithm-based search filter recommendation criteria are met (Operation 214). The algorithm-based search filter criteria may include, for example, a number of searches in a user's search history, a number of search filter selections in a user's search history, and a user's role in an organization.

Based on determining the algorithm search filter criteria are met, the applies a non-machine learning algorithm, such as a mathematical or logical algorithm, to a set of data including the search terms associated with a current search (Operation 216). For example, an algorithm may cause the system to obtain (a) the single most recent search filter selection for the user, (b) the two most frequent search filter selections by the user, (c) the single most frequent search filter selection by other users in the same enterprise and in the same role as the user, and (d) the single most frequent search filter selection across all users in the enterprise. In one example, the system presents the obtained search filter selections as recommendations in the GUI. Alternatively, the algorithm may perform further analysis to present a subset of the filters (a)-(d) to the user. For example, the system may perform a semantic analysis to determine which two of the search filters, from among (a)-(d), are most closely related to a current set of search terms entered by a user in a text entry field. The system may present the subset of search filters as search filter recommendations in the GUI without presenting the excluded search filters as recommendations in the GUI.

Based on the obtained search filter presentation policies, the system determines if hard-coded search filter recommendations exist (Operation 218). Hard-coded search filters include search filters entered by developers, programmers, system operators, and other users into a data object resource. The system retrieves the hard-coded search filter recommendations from the data object resource. The hard-coded search filters are not generated based on algorithms or machine learning model predictions. Instead, the hard-coded search filter recommendations specify the terms applied by the system to filter a set of search results.

Based on determining hard-coded search filter recommendations exist, the system retrieves the hard-coded search filter recommendations from a corresponding data object resource (Operation 220). For example, a data object resource associated with a particular application corresponding to a currently displayed GUI may include three hard-coded search filter recommendations. The system retrieves the three hard-coded search filter recommendations stored in the data object resource. The system may present the hard-coded search filter recommendations in the GUI. The system may filter the set of hard-coded search filter recommendations based on priority values associated with the hard-coded recommendations. Alternatively, the system may filter the set of hard-coded search filter recommendations based on a semantic analysis. For example, the system may determine which one of the three hard-coded search filter recommendations is most similar to a set of search terms entered by a user in a text entry field.

The system presents a set of search filter recommendations in the GUI based on the set of search filter recommendation policies (Operation 222). For example, the system may identify a set of policies in operation 208 that specify different compositions of machine learning-generated, algorithm-based, and hard-coded search filter recommendations based on different search filter recommendation criteria. The criteria may include, for example, (a) display data associated with display dimensions of search filter tiles in a GUI, (b) search history data of a user entering a set of search terms, (c) search history data of other users, and (d) confidence values associated with machine learning recommendations.

Confidence values associated with machine learning recommendations may be based on one or more confidence criteria. For example, the system may assign a higher confidence value to a search filter recommendation generated from a model trained on a higher quantity of training data. For example, the system may assign a higher confidence value to a recommendation generated by a first user-specific machine learning model trained on a training data set including 10,000 user search history records than a second user-specific machine learning model trained on a training data set including 5,000 user search history records. The system may assign a higher confidence value to a user-specific machine learning model (trained on a training data set of search records corresponding to the user and excluding other users) than to a role-based machine learning model (trained on a training data set of search records corresponding to different users in a same role at an enterprise). The system may assign a higher confidence value to a role-based, machine learning model than to a tenant-based machine learning model (trained on a training data set of search records corresponding to different users of a same tenant accessing computing resources in a computing environment).

In one or more embodiments, the system generates a confidence score for a machine learning model generated recommendation by performing a semantic analysis on the set of search terms entered by the user to determine the relatedness of the search terms to the terms included in a training data set for the machine learning model. If the system determines the set of search terms is not closely related to the terms in the training data set, the system assigns the recommendation a relatively low confidence score. If the system determines the set of search terms is closely related to the terms in the training data set, the system assigns the recommendation a relatively high confidence score. A relatedness may be based on semantic meaning identified in the semantic analysis. For example, a semantic-type machine learning model may determine if words have similar meanings and/or contexts. The system may also determine a number of times a search term appeared in a set of training data. If the term appeared relatively few times, the system may assign a recommendation generated by the model trained on the training data set a relatively low confidence score. In contrast, if the term appeared a relatively higher number of times, the system may assign a recommendation generated by the model trained on the training data set a relatively high confidence score.

In one or more embodiments, applying the search filter recommendation policies includes (a) determining a number of search filter tiles to present, (b) determining a composition of the presented search filter tiles, including determining a ratio of machine learning-generated search filter recommendations to algorithm-based recommendations to hard-coded search filters, and (c) determining an order in which to present the search filter recommendations.

In one or more embodiments, determining the search filter recommendations to generate and/or present and determining the order in which to present the search filter recommendations is based on priority values or weights assigned to the recommendations. As discussed above, the system may generate confidence scores associated with machine learning-generated recommendations. The system may generate weights for the machine learning-generated search filter recommendations based on the confidence scores. The system may further assign weights to hard-coded search filter recommendations and algorithm-generated recommendations.

For example, one search filter recommendation policy may assign a lowest weight to hard-coded search filter recommendations. The policy may assign a highest weight to a user-specific machine learning model recommendation if the recommendation has a confidence score exceeding a threshold. The policy may assign a middle weight (between the highest weight and the lowest weight) to an algorithm-based search filter recommendation based on the user's search history data. An example of a weight-assignment rubric is as follows: first user-specific machine learning model recommendation, where confidence value exceeds 0.8: weight=1; (b) first most frequently-selected search filter, search history exceeds 50 searches: weight=0.9; first role-based machine learning model recommendation, where confidence exceeds 0.8: weight=0.85; second user-specific machine learning model recommendation, where confidence value exceeds 0.8: weight=0.81; first tenant-based machine learning model recommendation, where confidence value exceeds 0.8: weight=0.75; first user-specific machine learning model recommendation, where confidence value does not exceed 0.8: weight=0.7; (b) first most frequently-selected search filter, search history exceeds 10 searches, does not exceed 50 searches: weight=0.65; first role-based machine learning model recommendation, where confidence does not exceed 0.8: weight=0.6; second user-specific machine learning model recommendation, where confidence value does not exceed 0.8: weight=0.55; first tenant-based machine learning model recommendation, where confidence value does not exceed 0.8: weight=0.5; first hard-coded recommendation: weight=0.45.

As illustrated in the example above, the same type of search filter recommendation may be assigned different weights based on (a) confidence values associated with the recommendation and (b) if the recommendation is the first, second, third, etc. of the recommendation type. For example, if a GUI displays six search filter tiles, the first search filter tile may be assigned to a user-specific machine learning model recommendation based on a high weight assigned to the recommendation. The second filter tile may be assigned to an algorithm-based recommendation. The third filter tile may be assigned to another user-based machine learning model recommendation. The search filter recommendation policy may assign a highest weight to a first recommendation generated by the user-specific machine learning model, a second-highest weight to an algorithm-based recommendation, and a third-highest weight to a second recommendation generated by the user-specific machine learning model.

In one or more embodiments, the system identifies search filter tiles associated with N number of highest weights. N may be a number greater than the a highest number of filter tiles that may be displayed in the GUI. For example, based on dimensions of a filter tile display region, a system may determine that, at most, 5 filter tiles may be displayed. However, the number of filter tiles displayed may depend, in part, on display characteristics such as a length of words in a filter tile. A system may be able to display 5 filter tiles corresponding to 5 short words in a search filter display region. The system may be able to display 3 filter tiles in the same filter tile display region when one or more of the search filters is characterized by long words. For example, some filter tiles may correspond to multiple key words and/or compound filters. In this example, determining the number of search filter recommendations in Operation 206 may be performed after generating a set of search filter recommendations ranked according to the search filter recommendation weights.

In one or more embodiments, the system determines an order for displaying search filter recommendations based on the ranking of the search filter recommendations. Additionally, or alternatively, the system may assign an alternative ranking for ordering the search filter tiles than for presenting the search filter tiles. For example, a user-specific machine learning model recommendation may correspond to the highest weight for presenting the recommendation in the GUI. However, the system may assign a high ranking to a hard-coded recommendation to order the hard-coded recommendation first among a set of displayed search filter tiles.

One or more embodiments display additional data together with search filter values. For example, a search filter tile may display both search filter values and a number of results that corresponds to the search filter tile. In one embodiment, the system refrains from displaying search filter tiles that would result in zero search results. For example, the system may assign a higher ranking to a tenant-based search filter recommendation than to a hard-coded search filter recommendation based on a relatively higher weight assigned to the tenant-based search filter recommendation. However, the system may determine that applying the tenant-based search filter recommendation would return zero search results. Accordingly, the system may modify the ranking to remove the tenant-based search filter recommendation from among a set of candidates for display in the GUI.

According to one or more embodiments, determining the composition of (a) how many machine learning-generated filter tile recommendations and (b) how many non-machine learning-generated filter tile recommendations to include in a filter tile display region provides a user-customized interface with a data set by increasing the relevance of search filter recommendations. Assigning relative weights to different search filter recommendations based on recommendation type and other recommendation criteria allows a system to automatically, without user intervention, execute a ranking and presentation process that might otherwise be impossible or impractical for a user to perform, such as by comparing search terms to machine learning training data to generate confidence scores and corresponding recommendation weights. In addition, determining the order of the search filter recommendation tiles improves the user interface by increasing the likelihood that the most relevant search filter tiles will be viewed first by the user.

4. Training a Machine Learning Model

Figure 3:
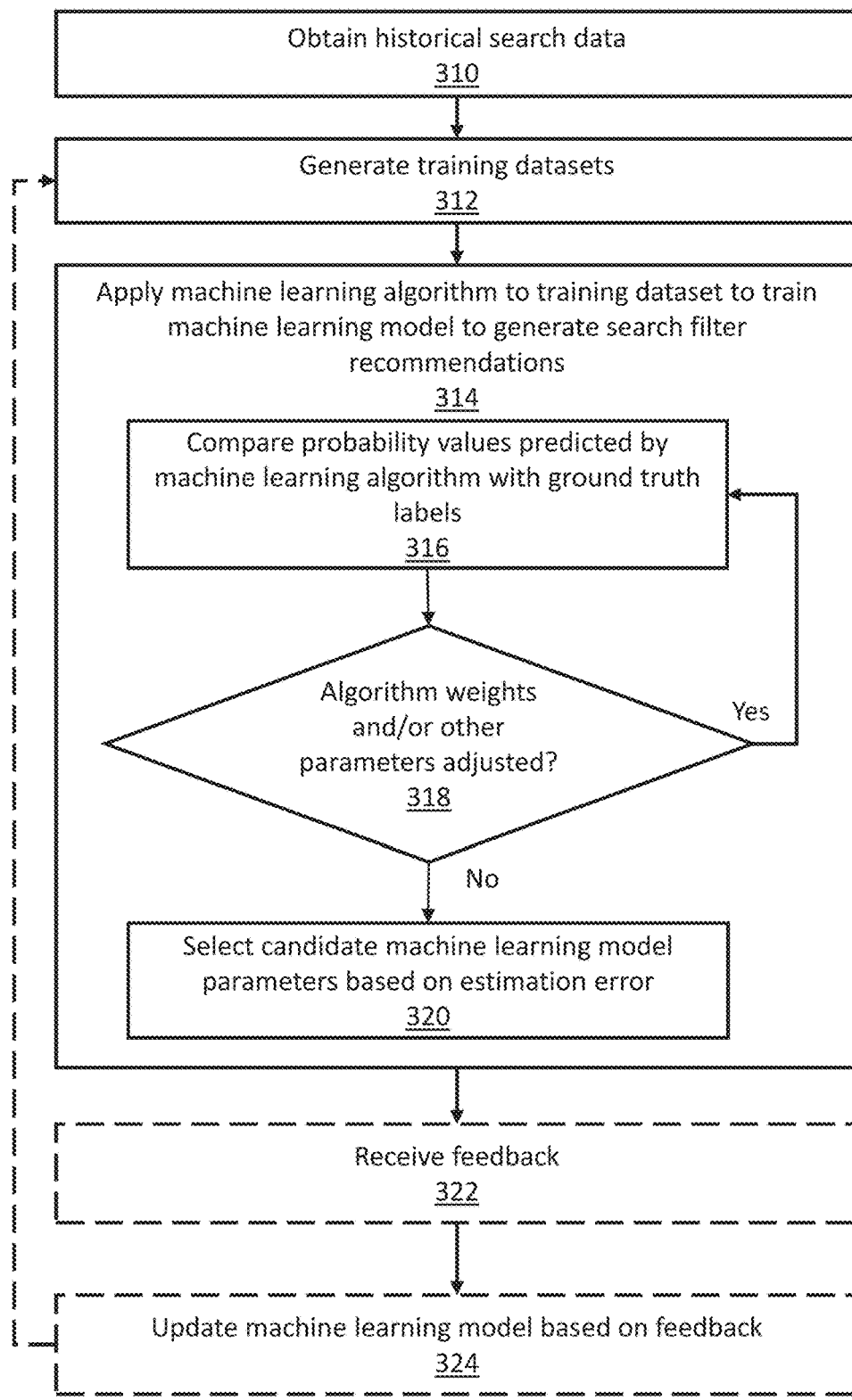
FIG. 3 illustrates an example set of operations for training a machine learning model to generate search filter tile recommendations in accordance with one or more embodiments.

FIG. 3 describes the training of a machine learning model for generating search filter recommendations in further detail. The operations of FIG. 3 apply to any of the models 135-137 described in FIG. 1A, for example, with each model being trained with a different set of training data to generate different recommendations. In one or more embodiments, a system (e.g., one or more components of system 100 illustrated in FIG. 1) obtains historical user search data (Operation 310). Obtaining the historical user search data may include obtaining any of the following: search terms entered by a single user, search terms entered by different users, search filters presented to one or more users, search filters selected by one or more users, and search results selected by one or more users.

The system uses the historical search data to generate a set of training data (Operation 312). The set of training data includes, for a particular set of search data, at least one classification label. For example, the system may classify a set of search data corresponding to a record in the training data with one or more search filters selected by a user. Additionally, or alternatively, the system may classify the set of search data with a search filter determined to be the most relevant to the search terms entered by a user or the most likely to return results most relevant to the search terms.

In some embodiments, generating the training data set includes generating a set of feature vectors for the labeled examples or records of the training dataset. A feature vector, for example, may be n-dimensional, where n represents the number of features in the vector. The number of features that are selected may vary depending on the implementation. The features may be curated in a supervised approach or automatically selected from extracted attributes during model training and/or tuning. In some embodiments, a feature within a feature vector is represented numerically by one or more bits. The system may convert categorical attributes to numerical representations using an encoding scheme, such as one-hot encoding, label encoding, and binary encoding. One-hot encoding creates a unique binary feature for each possible category in an original feature. In one-hot encoding, when one feature has a value of 1, the remaining features have a value of 0. For example, if a type of healthcare service has 10 different categories, the system may generate 10 different features of an input data set. When one category is present (e.g., value "1"), the remaining features are assigned a value "0." According to another example, the system may perform label encoding by assigning a unique numerical value to each category. According to yet another example, the system performs binary encoding by converting numerical values to binary digits and creating a new feature for each digit.

The system applies a machine learning algorithm to the training data set to train the machine learning model (Operation 314). For example, the machine learning algorithm may analyze the training data set to train neurons of a neural network with particular weights and offsets to associate particular search terms with particular search filters.

In some embodiments, the system iteratively applies the machine learning algorithm to a set of input data to generate an output set of labels, compares the generate labels to pre-generated labels associated with the input data, adjusts weights and offsets of the algorithm based on an error, and applies the algorithm to another set of input data.

In some embodiments, the system compares the predicted search filters generated through the one or more iterations of the machine learning model algorithm with ground truth labels to determine an estimation error (Operation 316). The system may perform this comparison for a test set of examples that may be a subset of examples in the training dataset that were not used to generate and fit the candidate models. The total estimation error for a particular iteration of the machine learning algorithm may be computed as a function of the magnitude of the difference and/or the number of examples for which the estimated label was wrongly predicted.

In some embodiments, the system determines whether or not to adjust the weights and/or other model parameters based on the estimation error (Operation 318). Adjustments may be made until a candidate model that minimizes the estimation error or otherwise achieves a threshold level of estimation error is identified. The process may return to Operation 318 to adjust and continue training the machine learning model.

In some embodiments, the system selects machine learning model parameters based on the estimation error meeting a threshold accuracy level (Operation 320). For example, the system may select a set of parameter values for a machine learning model based on determining that the trained model has an accuracy level for predicting labels for medical claims of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction.

In embodiments in which the machine learning algorithm is a supervised machine learning algorithm, the system may optionally receive feedback on the various aspects of the analysis described above (Operation 322). For example, the feedback may affirm or revise labels generated by the machine learning model. The machine learning model may predict a particular search filter for a particular set of search terms. The system may receive feedback indicating that the set of search terms should be associated with a different search filter. Based on the feedback, the machine learning training set may be updated (Operation 324), thereby improving its analytical accuracy. Once updated, the system may further train the machine learning model by optionally applying the model to additional training data sets.

4.1 Training the Confidence Prediction Machine Learning Model

In one or more embodiments, training the confidence prediction machine learning model 138 to generate confidence values for one or more search-filter generating models 135-137 includes pre-training a foundational model on a broad set of search data and fine-tuning the model with additional neural layers to generate confidence values. The foundational model may be an encoder-only type model that does not include a decoder. The encoder-only type model generates embeddings representing sets of search terms and search filters. A system may predict a relatedness of one set of words to another by comparing the embeddings. For example, the system may map embeddings in a multi-dimensional space and determine the distances between the embeddings to determine relatedness.

In one embodiment, the system obtains a pre-trained machine learning model that is trained on a dataset that includes a broad vocabulary to learn relationships among words and grammatical rules. The pre-trained ML model is trained to receive a sequence of tokens that represent words and sub-words as input data and generate an embedding representing the sequence as output data. The embedding is a multi-dimensional numerical vector.

The system creates a classification head by attaching an additional neural network layer to the output of the pre-trained machine learning model. Adding the classification head results in generating a different type of output data from the pre-trained machine learning model. While the pre-trained ML model is configured to receive sequences of tokens as input data and generate embeddings for the sequences as output data, the classification head is configured to receive the embeddings from the pre-trained machine learning model as input data and generate confidence values for search filter recommendations.

The system freezes the parameters of the pre-trained machine learning model. The offsets and coefficients of the pre-trained machine learning model are set at their pre-trained values to prevent the parameters from changing in subsequent training of the fine-tuned machine learning model including the classification head.

The system trains the confidence prediction machine learning model that includes the pre-trained model and the classification head with search filter recommendations. During training of the confidence prediction machine learning model, the parameters of the pre-trained ML model remain frozen while the system modifies the parameters of the neurons that make up the classification head.

5. Example Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

Figure 4A:
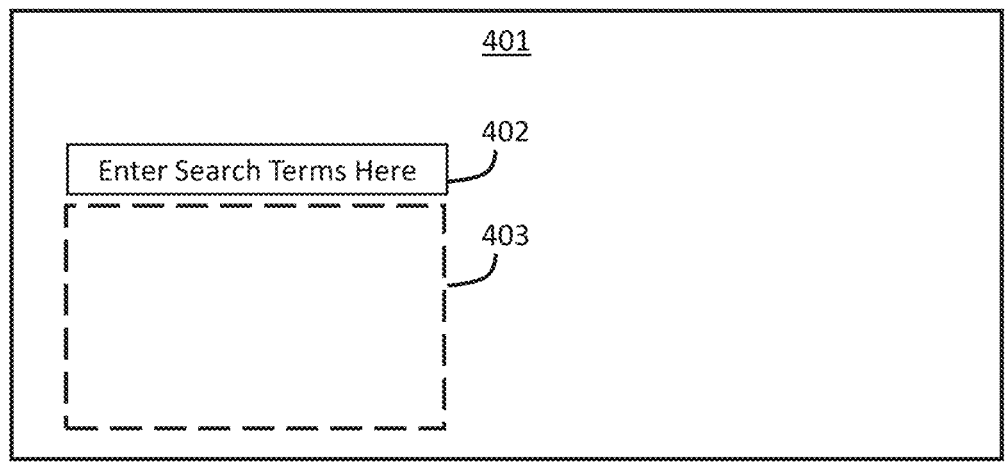
FIGS. 4A-4F illustrates an example embodiment.

FIGS. 4A-4D illustrate an example embodiment. FIG. 4A illustrates a graphical user interface (GUI) 401. The GUI 401 includes a text entry field 402. The dashed lines represent a search filter recommendation region 403. The text entry field 402 includes a prompt to receive a user input.

Figure 4B:
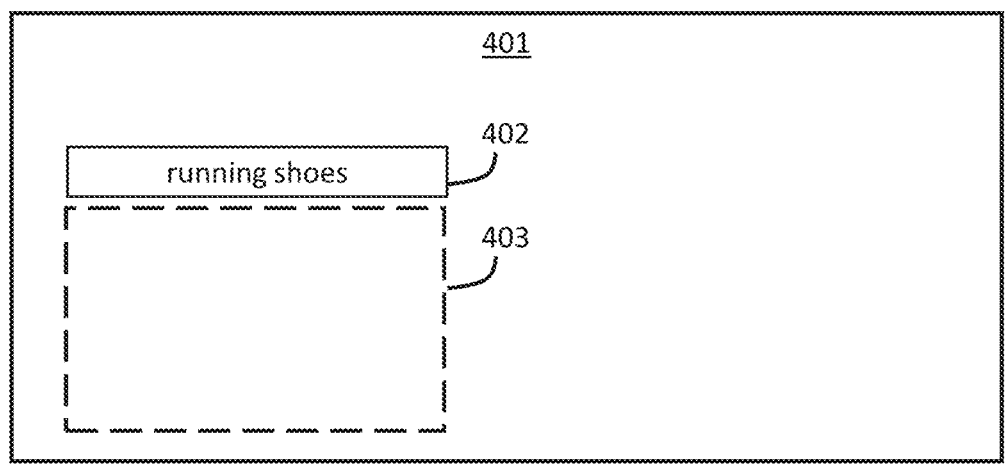

FIG. 4B illustrates a user input "running shoes." While FIG. 4B illustrates a text input, alternative embodiments include a user dragging-and-dropping an image, icon, or other selectable element from another region of the GUI 401 into the text entry field 402.

Figure 4C:
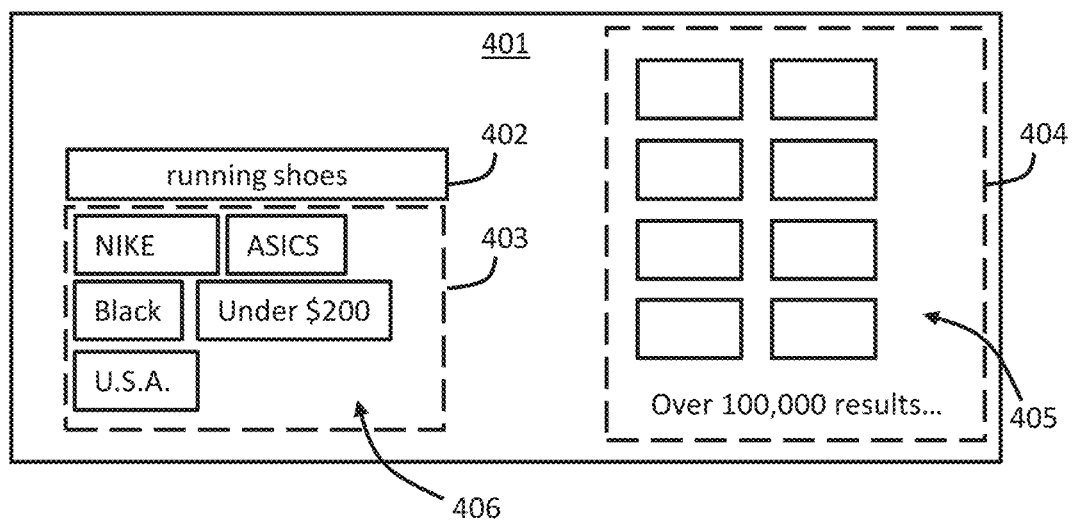

FIG. 4C illustrates the system presenting search results 405 and a set of search filter recommendations 406 based on the user input in the text entry field. The GUI 401 includes a search results presentation region 404. Based on the search "running shoes," the system queries content sources, such as websites on the Internet, to retrieve results 405 that match the search terms. The system presents icons representing the results 405. The system further indicates that the search would return over 100,000 results.

The system obtains search filter policy data to generate a set of recommended search filters 406. In the example embodiment of FIG. 4C, the system determines that the user entering the search terms "running shoes" has a search history of less than 10 searches. The system may identify the user based on profile data. For example, the GUI 401 may be presented by an application maintained by a tenant in a computing environment. The tenant may be a company. The user may be an employee of the company. The employee may need to log in to access applications, including the application that allows the user to search for content.

The system may retrieve a search filter recommendation policy associated with the running application that specifies the following: if a user's search history has less than 20 searches, generate a set of search filter recommendations based on (a) a role-based machine learning model, (b) a tenant-based machine learning model, and (c) a hard-coded search filter. The policy may further specify that the system should present among a set of search filter recommendations as many recommendations of the types (a) and (b) as will fit in a search filter recommendation region 403 if a confidence value for search filter recommendations beyond the first set of search filter recommendations exceeds 0.75. If the confidence values for the search filter recommendations do not exceed 0.75, the system should not present the additional search filter recommendations generated by the machine learning models.

The system further identifies from the search filter recommendation policy that the recommendations should be ordered as follows: (1) role-based machine learning model generated recommendation, (2) tenant-based machine learning model generated recommendation, (3)-(n) additional role-based machine learning model generated recommendations ranked according to confidence values, and (last) hard-coded search filter recommendation. The value (n) depends on the dimensions of the search filter recommendation region 403, the size of the search filter recommendation tiles, and the confidence values of the machine learning-generated search filter recommendations.

Based on the policy, the system generates the following set of search filter recommendations in the following order: (1) "NIKE" (generated by the role-based machine learning model), (2) "ASICS" (generated by the tenant-based machine learning model, (3) "Black" (generated by the tenant-based machine learning model), (4) "Under $200" (generated by the tenant-based machine learning model), and (5) "U.S.A." (hard-coded search filter recommendation).

Figure 4D:
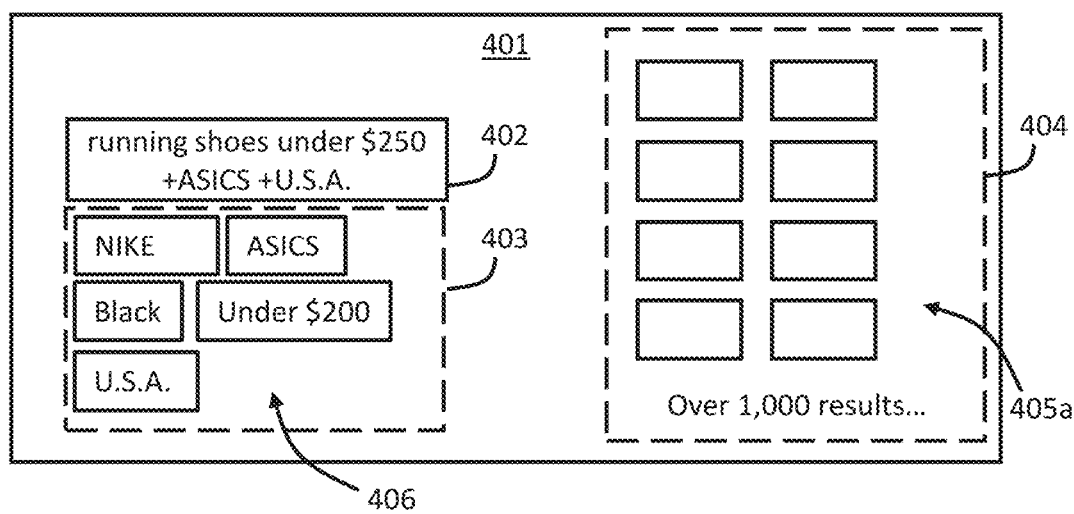

FIG. 4D illustrates a modified content search performed based on a user's selection of search filter recommendations. The user modifies the search terms to include "under $250." The user further selects search filter recommendation tiles corresponding to "ASICS" and "U.S.A." Based on the modified search terms and the applied filters, the system presents a modified set of search results 405a. The system further indicates that the filtered search results include over 1,000 results, compared to over 100,000 results associated with the original and unfiltered search illustrated in FIG. 4C.

Figure 4E:
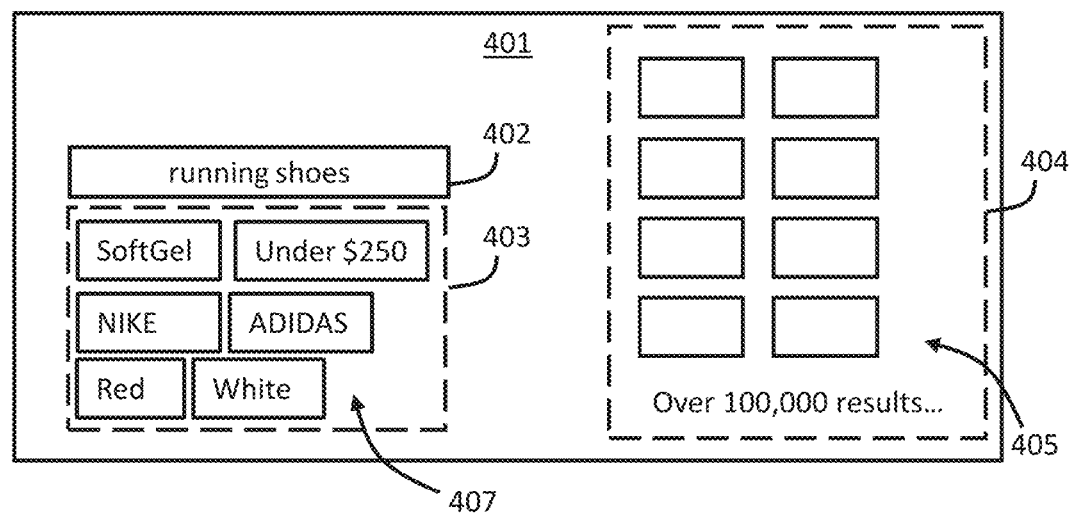

FIG. 4E illustrates presenting a set of search filter recommendations based on the system detecting a different set of conditions compared to those associated with FIG. 4C. In particular, in the example illustrated in FIG. 4E, the system determines the user search history includes over 5,000 search records. Based on the user search history, the system retrieves a search field recommendation policy that specifies the following: if a user's search history has more than 5,000 searches, generate a set of search filter recommendations based on (a) a user-specific machine learning model, (b) the user's most frequently-selected searches matching the search terms (if any), (c) a role-based machine learning model, and (d) a tenant-based machine learning model. The policy may specify weights applied to recommendations based on the type of machine learning model, the user search history, and the confidence values associated with the machine learning model generated recommendations. The policy may specify that any hard-coded search filter recommendations should be excluded from the presented set of search filter recommendations. The policy may specify ordering the search filter recommendations according to their assigned weights.

Based on the search filter recommendation policy, the system presents the following search filter recommendations in the following order: (1) "SoftGel" (generated by the user-specific machine learning model), (2) "Under $250" (included in the most-frequently-selected search filters in the user's search history), (3) "NIKE" (generated by the role-based machine learning model), (4) "ADIDAS" (generated by the role-based machine learning model), (5) "Red" (generated by the user-specific machine learning model), and (6) "White" (generated by the role-specific machine learning model). In the example embodiment, the recommendations from the role-specific machine learning model are associated with higher weights (e.g., a higher combination of a base weight assigned to the model type and a confidence value assigned to specific recommendations generated by the model) than recommendations from the tenant-specific machine learning model. Accordingly, the system does not present recommendations from the tenant-specific machine learning model.

Figure 4F:
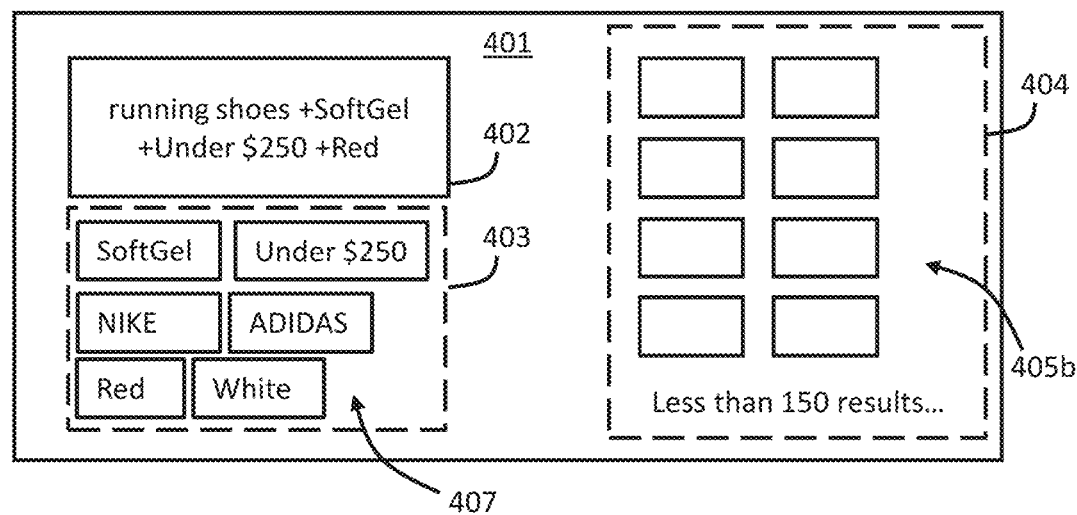

FIG. 4F illustrates a modified content search performed based on a user's selection of search filter recommendations. The user selects search filter recommendations "SoftGel," "Under $250," and "Red." Based on the modified search terms and the applied filters, the system presents a modified set of search results 405b. The system further indicates that the filtered search results include less than 150 results, compared to over 100,000 results associated with the original and unfiltered search illustrated in FIG. 4E.

As illustrated in the examples of FIGS. 4A-4F, the system determines a composition and ratio of different types of search filter recommendations based on different search filter recommendation criteria specified in search filter recommendation policies. When a first set of criteria is met, the system presents a set of search filter recommendations having a first composition of different types of recommendations (or recommendations generated based on different sources, including different types of machine learning models, algorithms, or hard-coded recommendations). When a second set of criteria is met, the system presents a different set of search filter recommendations having a second composition that is different from the first composition. For example, the system presents more recommendations from one type of machine learning model in a second set of search filter recommendations than in a first set of search filter recommendations. Since the system modifies the composition of different types of search filter recommendations based on changing search filter recommendation criteria, the system is able to evolve to increase the customization of search filter recommendations for individual users.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or a Solid-State Drive (SSD) is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions that, when executed by one or more hardware processors, cause performance of operations comprising:
    receiving, by a content search platform, a data transmission corresponding to a content search function, the data transmission received from a client device, the data transmission corresponding to a user interaction with an interface element in a graphical user interface (GUI) displayed on the client device, the interface element corresponding to the content search function;
    responsive to detecting the triggering event receiving the data transmission, determining in real-time search filter recommendations for the content search function at least by:
        retrieving a data object resource associated with the content search function;
        obtaining a set of search filter recommendation criteria from the data object resource;
        analyzing the search filter recommendation criteria to determine a ratio of (a) machine learning-generated search filter recommendations to (b) non-machine learning-generated search filter recommendations to include among a plurality of search filter recommendations to present in a Graphical User Interface (the GUI); and
        subsequent to determining the ratio and based on the ratio:
            determining a first number of machine learning-generated search filter recommendations and a second number of non-machine learning-generated search filter recommendations to present in the GUI;
            extracting a set of feature values from the data transmission;
            transmitting the set of feature values to a machine learning platform to generate a first set of machine learning-generated search filter recommendations based on the first number of machine learning-generated search filter recommendations;
            receiving, from the machine learning platform, the first set of machine-generated search filter recommendations; and
            selecting a second set of non-machine learning-generated search filter recommendations based on the second number of non-machine learning-generated search filter recommendations and based on a selection policy included in the data object resource; and
        presenting in the GUI or transmitting to the client device;
            (a) the first set of machine learning-generated search filter recommendations, and
            (b) the second set of non-machine learning-generated search filter recommendations.

2. The one or more non-transitory computer readable media of claim 1, wherein the operations further comprise:
    receiving user input selecting at least one search filter recommendation among the first and second sets of search filter recommendations; and
    applying a search filter corresponding to the at least one search filter recommendation to generate a first set of search results.

3. The one or more non-transitory computer readable media of claim 2, wherein the data transmission corresponding to the content search function corresponds to a second set of search results presented in the GUI responsive to a user entering one or more search terms into a text entry field in the GUI, wherein applying the search filter comprises omitting from the second set of search results at least one search result to generate the first set of search results.

4. The one or more non-transitory computer readable media of claim 1, wherein determining the first number of machine learning-generated search filter recommendations and the second number of non-machine learning-generated search filter recommendations to present in the GUI comprises:
    determining a total number of search filter recommendations including the first number of machine learning-generated search filter recommendations and the second number of non-machine learning-generated search filter recommendations,
    wherein determining the total number of search filter recommendations comprises:
    analyzing display data to determine the total number of search filter recommendations to be presented in a search filter display region of the GUI,
    wherein the ratio is based at least on the total number of search filter recommendations to be presented in the search filter display region of the GUI.

5. The one or more non-transitory computer readable media of claim 1, wherein the search filter recommendation criteria include at least one of:
    search history data including historical selections of search filters by a user;
    display data including the first number of the plurality of search filters;
    predefined rules specifying particular search filters; and
    confidence values associated with machine learning-generated search filter recommendations.

6. The one or more non-transitory computer readable media of claim 1, wherein the non-machine learning-generated search filter recommendations include recommendations to apply at least one of:
    a first search filter specified in a data object that corresponds to a first set of data presented in the GUI;
    a second search filter generated based on first search filter selection data, wherein the first search filter selection data specifies at least one of (a) a user's most-recently selected search filters and (b) the user's most frequently selected search filters; and a third search filter based on second search filter selection data, wherein the second search filter selection data specifies search filter selections of other users, other than the user.

7. The one or more non-transitory computer readable media of claim 1, wherein the machine learning-generated search filter recommendations include at least one of:
a first search filter recommendation generated by a first machine learning model trained on a first training dataset comprising historical search filter selections by a user;
a second search filter recommendation generated by a second machine learning model trained on a second training dataset comprising historical search filter selections by a first set of other users, other than the user, wherein the first set of other users comprises users in different roles within a same enterprise as the user; and
a third search filter recommendation generated by a third machine learning model trained on a third training dataset comprising historical search filter selections by a second set of other users, other than the user, wherein the second set of other users consists of users in a same role as the user.

8. A method comprising:
receiving, by a content search platform, a data transmission corresponding to a content search function, the data transmission received from a client device, the data transmission corresponding to a user interaction with an interface element in a graphical user interface (GUI) displayed on the client device, the interface element corresponding to the content search function;
responsive to receiving the data transmission, determining in real-time search filter recommendations for the content search function at least by:
retrieving a data object resource associated with the content search function;
obtaining a set of search filter recommendation criteria from the data object resource;
analyzing the search filter recommendation criteria to determine a ratio of (a) machine learning-generated search filter recommendations to (b) non-machine learning-generated search filter recommendations to include among a plurality of search filter recommendations to present in a Graphical User Interface (the GUI); and
subsequent to determining the ratio and based on the ratio:
determining a first number of machine learning-generated search filter recommendations and a second number of non-machine learning-generated search filter recommendations to present in the GUI;
extracting a set of feature values from the data transmission;
transmitting the set of feature values to a machine learning platform to generate a first set of machine learning-generated search filter recommendations based on the first number of machine learning-generated search filter recommendations;
receiving, from the machine learning platform, the first set of machine-generated search filter recommendations; and
selecting a second set of non-machine learning-generated search filter recommendations based on the second number of non-machine learning-generated search filter recommendations and based on a selection policy included in the data object resource; and
presenting in the GUI or transmitting to the client device;
(a) the first set of machine learning-generated search filter recommendations, and
(b) the second set of non-machine learning-generated search filter recommendations.

9. The method of claim 8, further comprising:
receiving user input selecting at least one search filter recommendation among the first and second sets of search filter recommendations; and
applying a search filter corresponding to the at least one search filter recommendation to generate a first set of search results.

10. The method of claim 9, wherein the data transmission corresponding to the content search function corresponds to a second set of search results presented in the GUI responsive to a user entering one or more search terms into a text entry field in the GUI,
wherein applying the search filter comprises omitting from the second set of search results at least one search result to generate the first set of search results.

11. The method of claim 8, wherein determining the first number of machine learning-generated search filter recommendations and the second number of non-machine learning-generated search filter recommendations to present in the GUI comprises:
determining a total number of search filter recommendations including the first number of machine learning-generated search filter recommendations and the second number of non-machine learning-generated search filter recommendations,
wherein determining the total number of search filter recommendations comprises:
analyzing display data to determine the total number of search filter recommendations to be presented in a search filter display region of the GUI,
wherein the ratio is based at least on the total number of search filter recommendations to be presented in the search filter display region of the GUI.

12. The method of claim 8, wherein the search filter recommendation criteria include at least one of:
search history data including historical selections of search filters by a user;
display data including the first number of the plurality of search filters;
predefined rules specifying particular search filters; and
confidence values associated with machine learning-generated search filter recommendations.

13. The method of claim 8, wherein the non-machine learning-generated search filter recommendations include recommendations to apply at least one of:
a first search filter specified in a data object that corresponds to a first set of data presented in the GUI;
a second search filter generated based on first search filter selection data, wherein the first search filter selection data specifies at least one of (a) a user's most-recently selected search filters and (b) the user's most frequently selected search filters; and
a third search filter based on second search filter selection data, wherein the second search filter selection data specifies search filter selections of other users, other than the user.

14. The method of claim 8, wherein the machine learning-generated search filter recommendations include at least one of:

a first search filter recommendation generated by a first machine learning model trained on a first training dataset comprising historical search filter selections by a user;

a second search filter recommendation generated by a second machine learning model trained on a second training dataset comprising historical search filter selections by a first set of other users, other than the user, wherein the first set of other users comprises users in different roles within a same enterprise as the user; and a third search filter recommendation generated by a third machine learning model trained on a third training dataset comprising historical search filter selections by a second set of other users, other than the user, wherein the second set of other users consists of users in a same role as the user.

15. A system comprising:

at least one device including a hardware processor;

the system being configured to perform operations comprising:

receiving, by a content search platform, a data transmission corresponding to a content search function, the data transmission received from a client device, the data transmission corresponding to a user interaction with an interface element in a graphical user interface (GUI) displayed on the client device, the interface element corresponding to the content search function;

responsive to receiving the data transmission, determining in real-time search filter recommendations for the content search function at least by:

retrieving a data object resource associated with the content search function;

obtaining a set of search filter recommendation criteria from the data object resource;

analyzing the search filter recommendation criteria to determine a ratio of (a) machine learning-generated search filter recommendations to (b) non-machine learning-generated search filter recommendations to include among a plurality of search filter recommendations to present in a Graphical User Interface (the GUI); and subsequent to determining the ratio and based on the ratio:

determining a first number of machine learning-generated search filter recommendations and a second number of non-machine learning-generated search filter recommendations to present in the GUI;

extracting a set of feature values from the data transmission;

transmitting the set of feature values to a machine learning platform to generate a first set of machine learning-generated search filter recommendations based on the first number of machine learning-generated search filter recommendations;

receiving, from the machine learning platform, the first set of machine-generated search filter recommendations; and selecting a second set of non-machine learning-generated search filter recommendations based on the second number of non-machine learning-generated search filter recommendations and based on a selection policy included in the data object resource; and presenting in the GUI or transmitting to the client device;

(a) the first set of machine learning-generated search filter recommendations, and (b) the second set of non-machine learning-generated search filter recommendations.

16. The system of claim 15, wherein the operations further comprise:

receiving user input selecting at least one search filter recommendation among the first and second sets of search filter recommendations; and applying a search filter corresponding to the at least one search filter recommendation to generate a first set of search results.

17. The system of claim 16, wherein the data transmission corresponding to the content search function corresponds to a second set of search results presented in the GUI responsive to a user entering one or more search terms into a text entry field in the GUI, wherein applying the search filter comprises omitting from the second set of search results at least one search result to generate the first set of search results.

18. The system of claim 15, wherein determining the first number of machine learning-generated search filter recommendations and the second number of non-machine learning-generated search filter recommendations to present in the GUI comprises:

determining a total number of search filter recommendations including the first number of machine learning-generated search filter recommendations and the second number of non-machine learning-generated search filter recommendations, wherein determining the total number of search filter recommendations comprises:

analyzing display data to determine the total number of search filter recommendations to be presented in a search filter display region of the GUI, wherein the ratio is based at least on the total number of search filter recommendations to be presented in the search filter display region of the GUI.

19. The system of claim 15, wherein the search filter recommendation criteria include at least one of:

search history data including historical selections of search filters by a user;

display data including the first number of the plurality of search filters;

predefined rules specifying particular search filters; and confidence values associated with machine learning-generated search filter recommendations.

20. The system of claim 15, wherein the non-machine learning-generated search filter recommendations include recommendations to apply at least one of:

a first search filter specified in a data object that corresponds to a first set of data presented in the GUI;

a second search filter generated based on first search filter selection data, wherein the first search filter selection data specifies at least one of (a) a user's most-recently selected search filters and (b) the user's most frequently selected search filters; and a third search filter based on second search filter selection data, wherein the second search filter selection data specifies search filter selections of other users, other than the user.

* * * * *

UNITED STATES PATENT AND TRADEMARK OFFICE
CERTIFICATE OF CORRECTION

| | | |
|---|---|---|
| PATENT NO. | : 12,373,502 B2 | Page 1 of 1 |
| APPLICATION NO. | : 18/758221 | |
| DATED | : July 29, 2025 | |
| INVENTOR(S) | : Chaudhuri et al. | |

It is certified that error appears in the above-identified patent and that said Letters Patent is hereby corrected as shown below:

In the Claims

In Column 27, Line 33, in Claim 1, delete "to detecting the triggering event" and insert -- to --, therefor.

In Column 27, Lines 46-47, in Claim 1, delete "in a Graphical User Interface (the GUI);" and insert -- in the GUI; --, therefor.

In Column 29, Lines 46-47, in Claim 8, delete "in a Graphical User Interface (the GUI);" and insert -- in the GUI; --, therefor.

In Column 31, Lines 41-42, in Claim 15, delete "in a Graphical User Interface (the GUI);" and insert -- in the GUI; --, therefor.

Signed and Sealed this
Twenty-third Day of December, 2025

John A. Squires
*Director of the United States Patent and Trademark Office*